No. 822,028. PATENTED MAY 29, 1906.
J. B. STRUBLE.
RAILWAY SIGNALING SYSTEM.
APPLICATION FILED JULY 13, 1904. RENEWED MAR. 7, 1905.
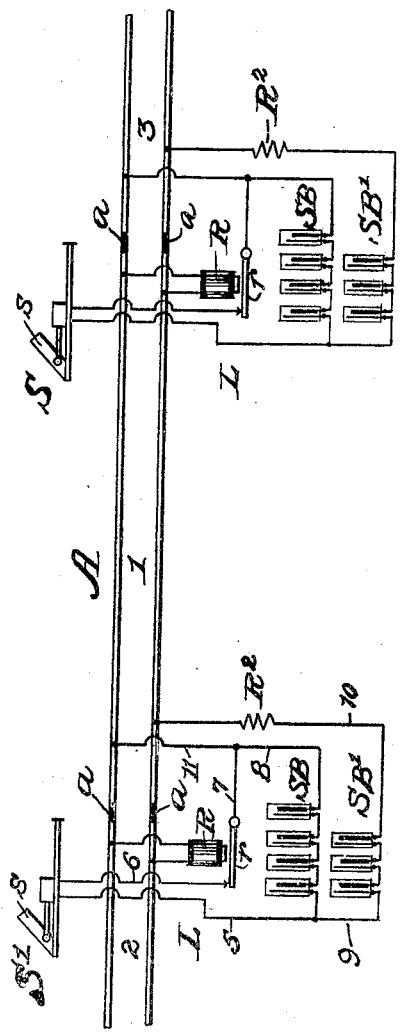
WITNESSES:
INVENTOR
Jacob B. Struble
BY
His ATTORNEY

UNITED STATES PATENT OFFICE.

JACOB B. STRUBLE, OF NEW YORK, N. Y., ASSIGNOR TO THE UNION SWITCH AND SIGNAL COMPANY, OF SWISSVALE, PENNSYLVANIA, A CORPORATION OF PENNSYLVANIA.

RAILWAY SIGNALING SYSTEM.

No. 822,028.     Specification of Letters Patent.     Patented May 29, 1906.

Application filed July 13, 1904. Renewed March 7, 1905. Serial No. 248,940.

*To all whom it may concern:*

Be it known that I, JACOB B. STRUBLE, a citizen of the United States, residing in the borough of Manhattan, city, county, and State of New York, have invented certain new and useful Improvements in Railway Signaling Systems, of which the following is a specification.

My invention relates to railway signaling systems, and particularly to the use of storage batteries in the track-circuits of such systems. I will describe a railway signaling system embodying my invention and then point out the novel features thereof in claims.

The accompanying drawing is a diagrammatic representation of a railway signaling system embodying my invention.

In signaling systems employing automatically-operated or automatically-controlled railway-signals, or both, of such types of signals, and especially railway-signals operated through an electric motor, economy in battery and current supply may be obtained by the use of storage batteries. In the case of electric-motor signals being employed in the signaling system further economy may be obtained by employing the batteries used to operate the motor of the railway-signal for track-circuit purposes. Preferably a high voltage is employed for operating the electric motors of the railway-signals, whereas a low voltage is desirable on the track-circuit. By my invention I am enabled to use the batteries for the motor-signal, which are of high voltage, for track-circuit purposes, and I obtain this result by the employment of means between these batteries and the track-rails which offer a counter force sufficient to obtain the necessary voltage for the track-circuit. These means are, in effect, adjustable, so that varying conditions existing in track-circuits may be met in a practical manner.

Referring now to the drawing, A designates a line of railway. At different points in each line of rail-sections insulation *a* is placed, and two adjacent insulation-points in each line of rail-sections define the limits of a track-circuit. Also the lines of rail-sections between two adjacent insulation-points in each of them is what is generally termed a "block-section." In the drawing I have shown one such block-section, (designated 1,) and portions of two adjacent block-sections, (designated 2 and 3.) At the entrance end of each block-section a railway-signal is provided, or there may be a plurality of such signals, each or all of which may be controlled from the track-circuit extending beyond the railway-signal. Any desired arrangement of railway-signals may be used, and they may be controlled from one or more track-circuits. In the drawing I have shown one railway-signal for each block-section. S S' designate two such signals, they being located at the entrance ends of the block-sections 1 and 2. Railway-signal S is controlled from the track-circuit provided for block-section 1, and railway-signal S' is controlled from the track-circuit of block-section 2.

Each railway-signal preferably comprises a signal device *s*, which by its color or position relatively to its support gives indications of the service condition of the block section or sections which it controls, and an operating mechanism for the signal device. I preferably employ a semaphore type of signal device and a mechanism comprising an electric motor for moving the semaphore on its pivot. Such a type of railway-signal is illustrated in United States Patent No. 611,943, granted October 4, 1894, in the name of J. G. Schreuder. The current for the electric motor of the signal is obtained from one or more batteries included in a local circuit, which circuit is primarily controlled from a translating device or relay included in a track-circuit. Preferably storage batteries will be used, and these are designated S B in the drawing. There may be two such sets of batteries provided for each railway-signal, which sets may be charged alternately or simultaneously from charging mains, or there may be only one such set which are charged as they run out. L designates the local circuit including these batteries and the mechanism of the railway-signal, which circuit also includes a movable member or armature of the translating device or relay of a track-circuit.

The track-circuit for each block-section comprises a source of current, the track-rails, or portions of them, of a block-section, and a translating device or relay. R designates the translating device, and r the movable member or armature thereof. Ordinarily the source of current for a track-circuit is independent of any other source; but in the present invention the current for a track-circuit is obtained from the storage batteries for the railway-signal of the succeeding block-section. For example, current for the track-circuit of block-section 1 is obtained from the storage batteries S B, intended for the operation of the railway-signal S', controlling the passage of trains into and along the block-section 2. As the voltage and current of the storage batteries S B for any railway-signal is above that required for a track-circuit, I reduce this voltage and current for track-circuit purposes and without interfering with the voltage and current for the electric motor of the mechanism of the railway-signal by introducing into a conductor connecting these storage batteries with a track-circuit means for producing a counter force. These means are preferably storage batteries either charged or discharged. The means for producing the counter electromotive force may be worn-out discarded cells of almost any description or simply lead plates immersed in an electrolyte. In short, any means may be used other than ohmic resistance which tend to reduce the voltage and current of the storage batteries S B for track-circuit purposes. In the drawing I have shown four cells for operating the electric motor of a railway-signal and three cells S B', which serve as the means for offering the counter force. Assuming that each cell of the S B set of batteries and the S B' set of batteries is each of two volts capacity and the same internal resistance and the cells in each set be connected in series and the cells of both sets connected to oppose each other, then the voltage and current supplied to the track-circuit will be equal to one cell or two volts and the current of one cell. A resistance $R^2$ is included in the conductor connected with the track-circuit to prevent excessive flow of current when the track-rails of a track-circuit are bridged by a pair of wheels and axle of a train.

In the example above stated it was assumed that the cells in the set S B' were charged. It is not necessary that they be charged, and they may be discharged cells. In the latter case as soon as they are included in the circuit they will be charged from the cells in the set S B and will after a time develop the necessary counter force to reduce the voltage in the track-circuit.

The local circuit L for the electric motor comprised in the mechanism of the railway-signal S' is set of batteries S B, wire 5, mechanism of the railway-signal, wire 6, movable member r of translating device R and its contact and wires 7 and 8 to batteries. The track-circuit of block-section 1 is set of batteries S B of railway-signal S', wire 9, counter-force cells S B', wire 10, resistance $R^2$, one track-rail of block-section 1, through coil of translating device R, other track-rail of block-section 1, and wires 11 and 8 to batteries S B.

It will be observed that the voltage for track-circuit purposes can be easily varied by increasing the voltage of the set of batteries S B or by decreasing the counter force afforded by the set of batteries S B'.

Various modifications and arrangements of the circuits between the sets of batteries and the local and track circuits, as well as in the arrangement of the means for producing a counter force may be made without departing from the spirit of my invention.

Wherever I use the term "counter force" or "means for obtaining or producing a counter force" I wish to be understood as meaning any device, apparatus, or means for counterbalancing or reducing voltage and current as distinguished from ohmic resistance.

What I claim as my invention is—

1. In a railway signaling system, the combination with a plurality of block-sections, a railway-signal for each block-section comprising electrically operated or controlled mechanism, storage batteries for operating the railway-signal of a block-section, a track-circuit for each block-section obtaining its current-supply from said storage batteries, and means for producing a counter force to the storage batteries connected with the track-circuit.

2. In a railway signaling system, the combination with a plurality of block-sections, a railway-signal for each block-section comprising electrically operated or controlled mechanism, a set of storage batteries for the mechanism of the railway-signal for a block-section, a track-circuit for each block-section and having electrical connection with an adjacent set of storage batteries whereby they may supply current to a track-circuit, and other storage batteries in said electrical connection serving as a counter force to the first-mentioned set of storage batteries.

3. In a railway signaling system, the combination with a plurality of block-sections, a railway-signal for each block-section comprising electrically operated or controlled mechanism, a set of storage batteries for the mechanism of the railway-signal for a block-section, a track-circuit for each block-section and having electrical connection with an adjacent set of storage batteries whereby they may supply current to a track-circuit, and means in said electrical connection for producing a counter force to said set of storage batteries.

4. The combination with a plurality of circuits each containing a translating apparatus and requiring different electromotive forces, a generator of current common to all of said circuits and means in one or more of the circuits for offering a counter force to the electromotive force of the current from the generator, wherby the electromotive force of the generator in said circuits is reduced.

In testimony whereof I have signed my name to this specification in the presence of two subscribed witnesses.

JACOB B. STRUBLE.

Witnesses:
A. HERMAN WEGNER,
C. W. VAN NOSTRAND.